United States Patent [19]

Groeneweg

[11] Patent Number: 4,531,680
[45] Date of Patent: Jul. 30, 1985

[54] MANURE SPREADER

[76] Inventor: Ronald L. Groeneweg, 232 6th Ave., Sioux Center, Iowa 51250

[21] Appl. No.: 482,541

[22] Filed: Apr. 6, 1983

[51] Int. Cl.³ .............................................. A01C 19/00
[52] U.S. Cl. .................................... 239/676; 239/678; 414/521
[58] Field of Search ................ 239/672, 676, 678–680, 239/189; 414/521, 514; 91/24–26; 198/851

[56] References Cited

U.S. PATENT DOCUMENTS

| | | | |
|---|---|---|---|
| 873,823 | 12/1907 | Zachow | 239/678 |
| 1,251,372 | 12/1917 | Hewitt | 414/521 |
| 1,953,388 | 4/1934 | Bettin | 198/851 |
| 2,143,593 | 1/1939 | Bryant | 198/851 |
| 3,388,786 | 6/1968 | Thomson | 198/851 |
| 4,162,735 | 7/1979 | Lewis | 414/521 |

Primary Examiner—Andres Kashnikow
Assistant Examiner—James R. Moon, Jr.
Attorney, Agent, or Firm—Harry J. Watson

[57] ABSTRACT

An improved manure spreader and process for unloading and spreading utilizes a powered flexible reversible movable floor which moves with the load towards the thrower so that the load is uniformly conveyed without relative movement between the load and the flexible movable floor and with an automatic stop system to stop movement of the floor when an upright wall portion of the movable floor reaches the area of the thrower with the automatic system also stopping the upright portion of the movable floor at its maximum extension for the loading mode after it has been reversed.

6 Claims, 7 Drawing Figures

MANURE SPREADER

BACKGROUND OF THE INVENTION

This invention is an improvement of the so called "manure spreader" which is an apparatus for hauling animal wastes to a suitable location where they can be unloaded or spread in a uniform manner over an area of ground to gain the fertilizer value contained in the waste. Typically they are wheeled vehicles having a load box or bed, which can be pulled by a tractor or other vehicle to a designated spreading area. An unloading mechanism can be actuated which provides a continuous delivery of the load in the load box toward the rear end of the spreader. The rear end of the spreader generally contains a broadcasting device or thrower which will spread the load as delivered uniformly over a fairly sizeable area as the spreader moves along.

Conventional spreaders contain a series of spaced parallel bars transverse to the direction of travel, lying on the floor of the load box which are separated from each other. The ends of the bars are fixed to chains positioned near the sides of the floor of the load bed which rest on the load bed floor. The chains each form a loop running above and below the load bed floor. Each chain turns about idlers or sprockets located at front and rear of the spreader wherein the loop is disposed in a vertical plane running longitudinally in the direction of travel. The chains are powered to drag the bars or slats slowly across the floor of the load bed towards the rear of the spreader. This action drags the load of waste gradually towards the rear most end of the spreader so that a supply of waste is fed to the thrower at the rear of the machine until the load is distributed. The distribution usually occurs while the vehicle is in motion so that a uniform pattern of distribution over an area is obtained.

Operation of this type of unloader is obtained by engaging or disengaging the power that drives the chains which in turn moves the slats across the load bed floor. This action continues until the load is emptied. Difficulties with this type of unloader are encountered when "bridging" of the load occurs or when the slats freeze to the load or floor in very cold weather and thus prevent operation or cause damage or breakage of the chains or drive system. Bridging occurs when the load does not fall down onto the area where the moving bars are located and when the underneath material is pulled out by the moving bars a tunnel remains which will not by itself unload further. The operator does not have positive control of the unloading with the conventional spreader and slow and uneven spreading tends to occur at the end of each unloading cycle. Additional time is required to attempt to clean out the load bed with the moving bars and chains and manual clean-up is sometimes required. A condition called "fallback" tends to occur toward the end of the unloading cycle with certain manure or manure-straw combinations whereby the material tends to roll away from the thrower by falling back towards the front of the machine which adds time to the process and reduces the uniformity of spreading.

Another type of manure spreading device in use contains the same features as indicated above except that the unloading mechanism consists of an upright wall transverse to the main axis of the spreader. The wall is powered by one or more hydraulic cylinders and can be retracted into the area near the front of the spreader. The wall rests on the load bed floor and can slide along it. Once the spreader is loaded and ready for discharge, the hydraulic control system provides power to the hydraulic cylinders in a controlled manner so that the cylinders slowly push the upright wall along and consequently the load moves along the floor towards the rear of the spreader where the rotating distributor is located.

The cylinders or a control system for the cylinders is designed to stop the upright wall at the rear of the machine before it reaches the moving parts of the distributor. Usually this is obtained by limiting the design length of the hydraulic cylinder or cylinders. The power comes from the hydraulic system of the tractor itself and through a valve and hoses or tubes is connected to the hydraulic cylinders of the spreader so that reversing the direction of the hydraulic flow to the cylinders will cause the cylinders to retract to the beginning position to complete the cycle.

This device has the difficulties of high cost particularly for design and construction of hydraulic cylinders sufficiently large to provide motion of the wall through the entire length of the load bed. It has the additional difficulty that in cold weather a partially frozen load can cause damage to the mechanical components if full working pressure of the hydraulic system is applied and it may fail to unload if a substantially lower pressure is applied through an internal relief valve. Devices of this kind are subject to non-uniform and varying resistance from the load and for certain consistencies of material can result in "compression" of the load causing it to have different characteristics at different points in the unloading cycle or causing it to rise up so that varying volumes of material are presented to the thrower at different times.

BRIEF SUMMARY OF THE INVENTION

This invention provides a new and different way of moving the load toward the distributor at the rear of a spreader by providing a flexible, movable floor as the bottom of the load bed of the spreader. The flexible movable floor both supports and moves the load as needed. To the forward end of the flexible, movable floor is attached an upright transverse wall or headwall which moves together with the floor to provide a positive control over the movement of the load toward the rear as the floor moves towards the rear. The floor is composed of uniformly sized abutting transverse slats which extend across the width of the load box in a roughly horizontal plane. Each of the slats is attached to individual links which are joined together underneath the slats flexibly to form chains which rotate over fore and aft idler rolls. One of the idlers has sprocket teeth which engage and drive the chain by means of a reversible hydraulic motor that is powered by the tractor's hydraulic system and which is connected to a variable speed control valve on the tractor to control unloading speed. The spreader has a new and different hydraulic control in the hydraulic system of the reversible motor responding to the extreme positions of the upright, transverse, movable wall by automatically interrupting the flow of hydraulic fluid to the motor when the extreme position is reached but which also allows reverse motion of the moveable floor and wall to complete the cycle when the flow of hydraulic fluid is reversed.

The hydraulic system for the flexible movable floor of the spreader is used in conjunction with a tractor hydraulic system which has a hydraulic pump and control valve. Quick connect couplers from the tractor system join the spreader hydraulic system to it. The tractor hydraulic system provides reversible flow. The thrower hydraulic system is separate from the spreader hydraulic system and may be driven by a power take-off unit mechanically or hydraulically or from a separate hydraulic system on the tractor.

The invention provides a new concept in an efficient, economical, and long-lasting unloading device. The flexible movable floor conveys or carries the material towards the thrower rather than dragging or pushing it along and thus minimizes resistance. The headwall becomes a splash shield as it approaches the thrower during unloading to keep waste material from pushing away from the thrower or being thrown back in the direction of the operator. Corrosion and jamming of the unloading chains is avoided because they are not directly exposed to the waste material. The uniform and positive delivery of the material to the thrower results in more uniform spreading and complete unloading even in cold weather. The automatic stopping feature requires no attention of the operator at the end of a cycle and reduces damage and maintenance by isolating pressure in the hydraulic components of the spreader's hydraulic system rather than by forces on mechanical components. Since the entire load is at all times carried by the movable floor bunching of the load caused by compression or non-uniform spreading by fallback is eliminated. For the same reason bridging is eliminated. The positive delivery of the material to the thrower eliminates slow and uneven spreading at the end of each unloading cycle. There is no need for manual clean-up since freezing will not interfere with subsequent unloading because the entire floor moves with the load.

BRIEF DESCRIPTION OF THE DRAWINGS

There are 6 sheets of drawings containing several figures.

DETAILED DESCRIPTION AND SPECIFICATION

Figure 1:
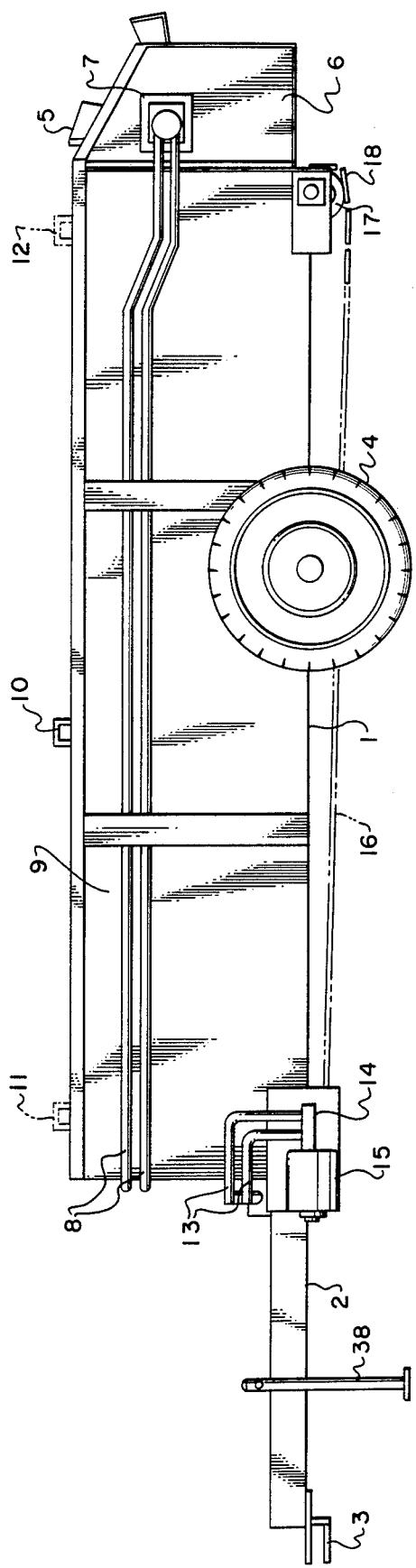
FIG. 1 is a side view of the spreader.

A more detailed description is given here with numbers for a given part being the same in all figures of the drawings. In FIG. 1 a mobile frame 1 is a movable support structure for the parts of a manure spreader. An extended tube 2 serves as a tongue and together with a hitch 3 connected thereto provides a means for mechanical connection of the spreader to a tractor which can tow the spreader in the usual manner behind the tractor. A retractable stand 38 is provided to support the tongue when needed. Axially supported wheels 4 support the movable frame at a suitable distance above the level of the ground. The longitudinal axis of the machine would lie in the direction of travel roughly parallel to the extended tube forming the tongue and the transverse direction would be roughly parallel to the axis of the wheels 4 shown in FIG. 1. A manure distributing device with distributing blades 5 is removably affixed to the rear of the movable frame between opposite removable sides 6 by means of an axially transverse rotary shaft drivably connected to a hydraulic motor 7. Hydraulic lines 8 capable of providing pressurized hydraulic fluid to the motor 7 are forwardly disposed along two oppositely disposed sides 9 which form a part of the movable frame. An upright movable head wall disposed transversely in the upright position between the oppositely disposed upright sides 9 is partly visible above the sides 9 as head wall 10. The extreme front position of head wall 10 is shown at 11 and the extreme rear most position of head wall 10 is shown at 12.

A pair of hydraulic lines 13 are operatively connected to a reversible hydraulic motor 14 which drives a reversible gear box 15. The output of gear box 15 is capable of turning an axially transverse rotary sprocket shaft (not visible in this view) which has sprockets with teeth which can engage and drive chains 16. Chains 16 form a continuous loop extending between the forwardly located sprockets and an axially transverse rotary idler roll or rolls 17. The chains 16 have a plurality of transverse abuttable slats 18 affixed thereto which may move with the chains and rotate about the axis of the idler roll or rolls 17. A flexible movable floor is thus formed between the side walls 9 which will be further described.

Figure 2:
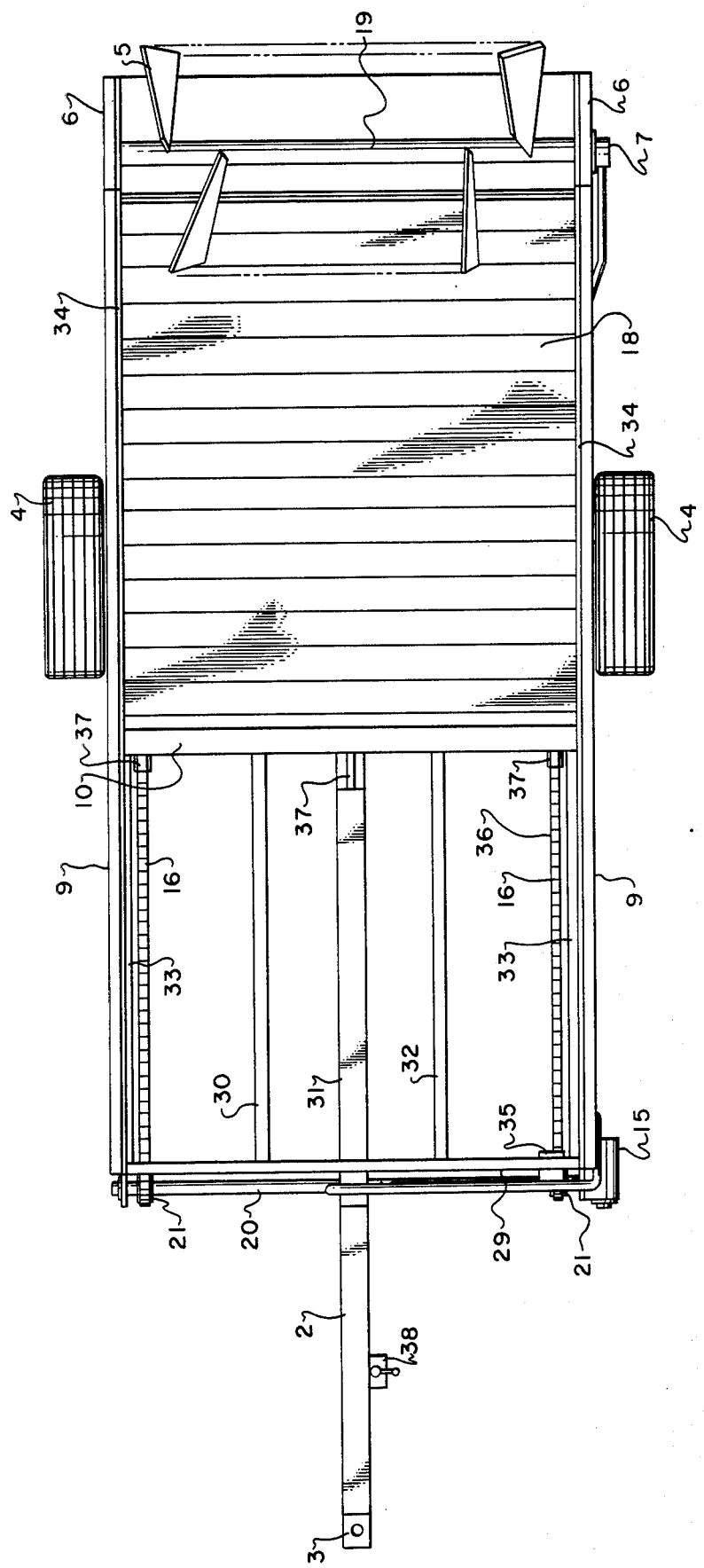
FIG. 2 is a plan view of the spreader whose side view is shown in FIG. 1 showing the movable floor partly operated toward the rear.

In FIG. 2 a plan view is shown looking downward upon the spreader of FIG. 1. The axially transverse rotary shaft 19 of the manure distributor having angularly disposed distributor blades 5 is powered by motor 7 to rotate. When a load of spreadable material such as manure is moved towards the rotating blades 5 a flinging action causes the material to be distributed over an area behind the spreader. The disposition of the upright head wall 10 and the individual slats 18 which form a part of the flexible movable floor are better seen in this view. The positioning of the chains 16 is more clearly seen here. At the front of the spreader a gear box 15 turns an axially transverse rotary shaft 20 to which is fixed sprockets 21 having teeth which engage the chains 16. The rotation of the sprockets will cause the chains to move parallel to the longitudinal axis of the spreader. Since the head wall 10 and the plurality of slats 18 are connected to the chains 16, movement of the chains in either direction causes corresponding movement of the flexible movable floor thus formed.

Figure 6:
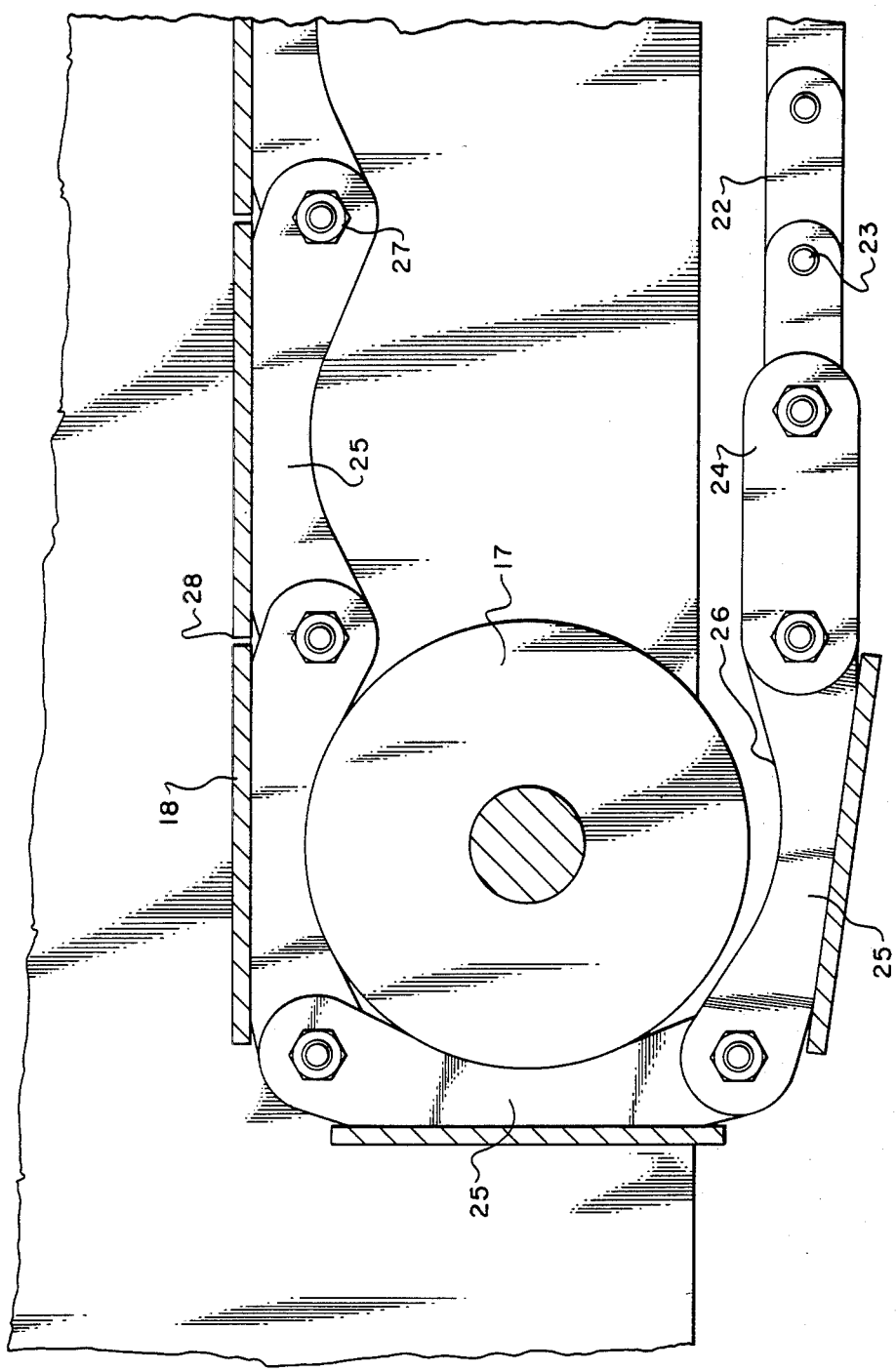
FIG. 6 is Section AA of FIG. 4 which details the construction of the transverse floor slats and links which form the chain which changes direction about an idler and a sprocket.

In FIG. 6 a side view of the chain visible in FIG. 2 shows the chain having links 22 flexibly joined with similar links by pins 23. The portion of the chain visible in FIG. 2 is a conventional type chain designed to change direction over and be driven by sprockets. A connecting link 24 joins the end of the conventional chain with links 25. Chain links 25 are fixed to the slats 18 by suitable means and the links 25 have a curved portion 26 as shown which is suitable for contacting and rotating about idler rolls 17. The slat supporting chain links 25 are flexibly connected to each other by bolts or pins 27.

The width of the abutting slats 18 is the same or slightly less than the center to center distance of the bolts or pins 27 in the slat supporting chain links 25. When the slats 18 are in the upper position the slat edges 28 abutt each other and together with the slat supporting chain links 25 form a flexible floor which extends transversely between the sides 9 of the mobile frame 1.

Returning now to FIG. 2, the general arrangement and further features may be seen. The mobile frame has a front 29 which ties the sides 9 and other support members of the frame together. This front portion need not be a solid wall structure since the upright movable head wall 10 extending between the sides 9 provides a solid front surface to contain a load. The lower portion of the front 29 provides a transverse member to which longitudinal members 30, 31 and 32 are attached. The rear most ends of these longitudinal members are fixed to another transverse member (not shown) at the rear of the machine as part of the mobile frame. Other similar longitudinal members 33 of the mobile frame extend between the front and rear transverse members just described along the sides 9. The upper most portion of all the longitudinal horizontal members 30, 31, 32 and 33 form a generally horizontal plane just under the bottom of the slats 18 to provide a means for supporting the movable floor formed by the slats 18. The weight of the movable floor itself or the additional weight of a load placed on the movable floor causes the slats to rest upon the longitudinal members of the movable frame. In effect the movable floor may be dragged along by the action of the chain. The longitudinal horizontal members provide support no matter where the movable floor may be located between its extreme forward most and rearward most position. Ledges 34 are provided longitudinally along the sides 9 and are affixed thereto in a position just above the upper most surfaces of the slats 18 of the movable floor and which extend the full length of the machine. The ledges 34 have a slight gap between them and the slats 18 so as not to impede the motion of the movable floor but they prevent the movable floor from rising upwards so that the movable floor is constrained between the ledges and the longitudinal support members.

A control valve 35 is shown which as will be shown provides a means for automatically stopping the movable floor in its extreme most positions. A stop 36 is fixed to the chain extending downwardly as shown which moves forward in the unloading mode with the chain until it finally rotates about the sprocket 21 and interacts with the control valve 35 so as to cause the movable floor to stop in its rearward most position. Similarly gussets 37 of different sizes are provided to stabilize the upright movable head wall 10 and the gusset 37 on the side of the frame in line with the control valve similarly interacts with the control valve 35 to stop the movable floor in its forward most position. This is the loading mode with the head wall 10 stopped near the front of the spreader. A stand 38 is provided to keep the movable frame in a roughly horizontal position with respect to the ground when the spreader is not attached to a tractor. It is attached to the tongue 2 which is an extension of the longitudinal member 31.

Figure 3:
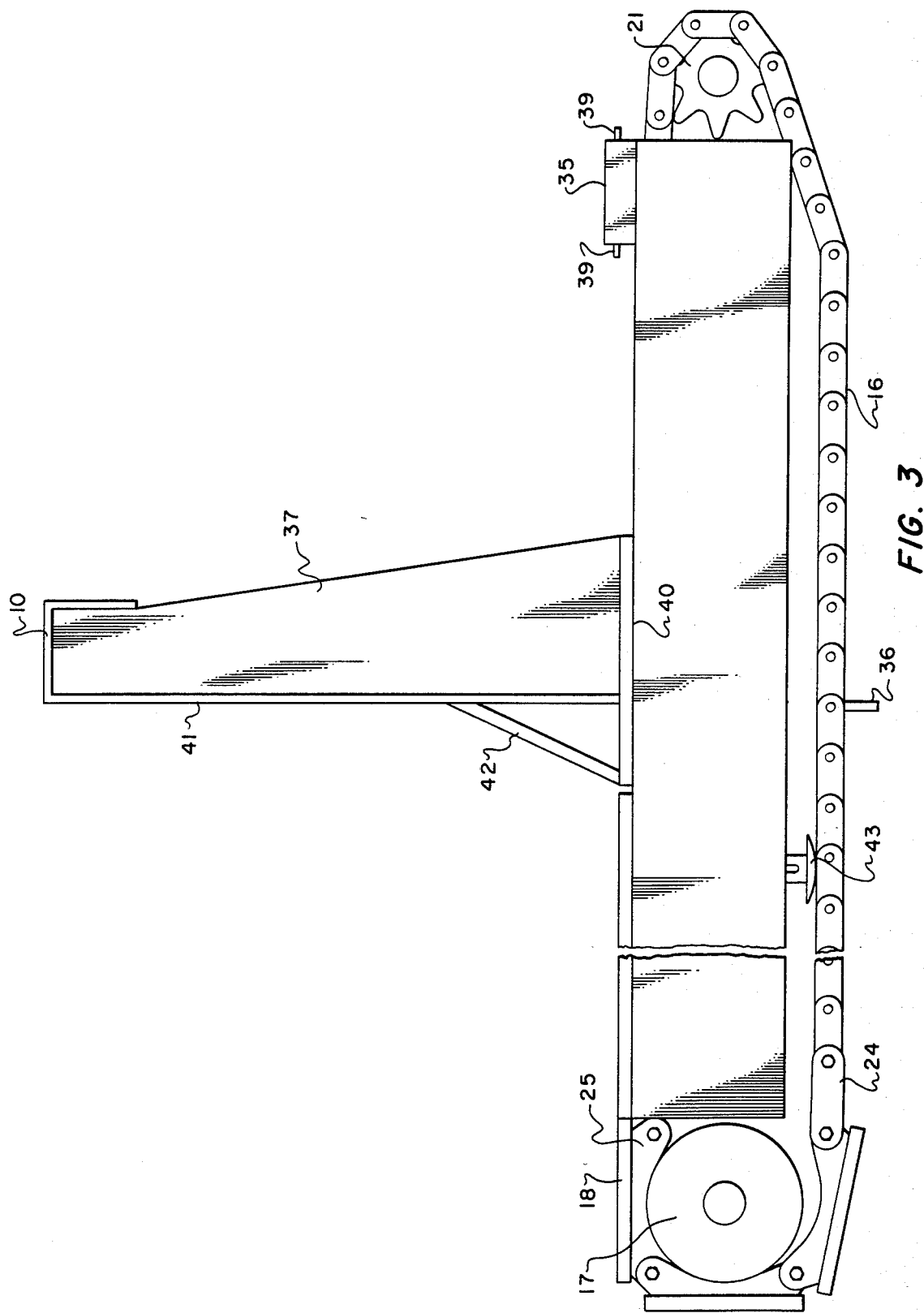
FIG. 3 shows the details of the flexible, movable floor in a side view and indicates the attachment of the transverse vertical wall.

FIG. 3 is a side view of the chain loop showing a sprocket 21 and idler roll 17 over which the chain travels during operation. The upright movable head wall 10 is more clearly seen with its supporting gussets 37 at least one of which is in line with a plunger 39 of the control valve 35. A stop 36 is attached to the chain 16 which moves with the chain until it contacts an opposite plunger 39 of the control valve. The head wall 10 and its gussets 37 are fixed to a base 40 which in turn is fixed like the slats are to one or more of the links 25 so that it must move along with the movable floor. The head wall 10 has a front surface 41 and an angulated front surface 42 across the width of the movable floor between the sides 9.

A connecting link 24 joins the chain links 25 for the movable floor to the chain 16. A similar connecting link which is not visible is located just below the lower most extension of the gusset 37 to join the last link in the chain 16 to the first link 25 under the base 40. The type of chain link beneath the base 40 and to which it is attached is immaterial since the head wall 10 will never move so far as to go around the idler 17 because the stop 36 will interact with the control valve plunger 39 of the control valve 35 to stop the motion of the movable floor before this is permitted to happen. Thus the base 40 could be extended over two or more of the links 25 if desired.

A chain tightener 43 attached to the movable frame is downwardly adjustable to provide a means for eliminating slack in the chain loop formed by the chain 16. A turn buckle connecting link can be used in place of link 24 or in addition to it to provide a means for adjusting the length of the chain 16 to take up any slack in the chain loop or to facilitate maintenance.

Figure 4:
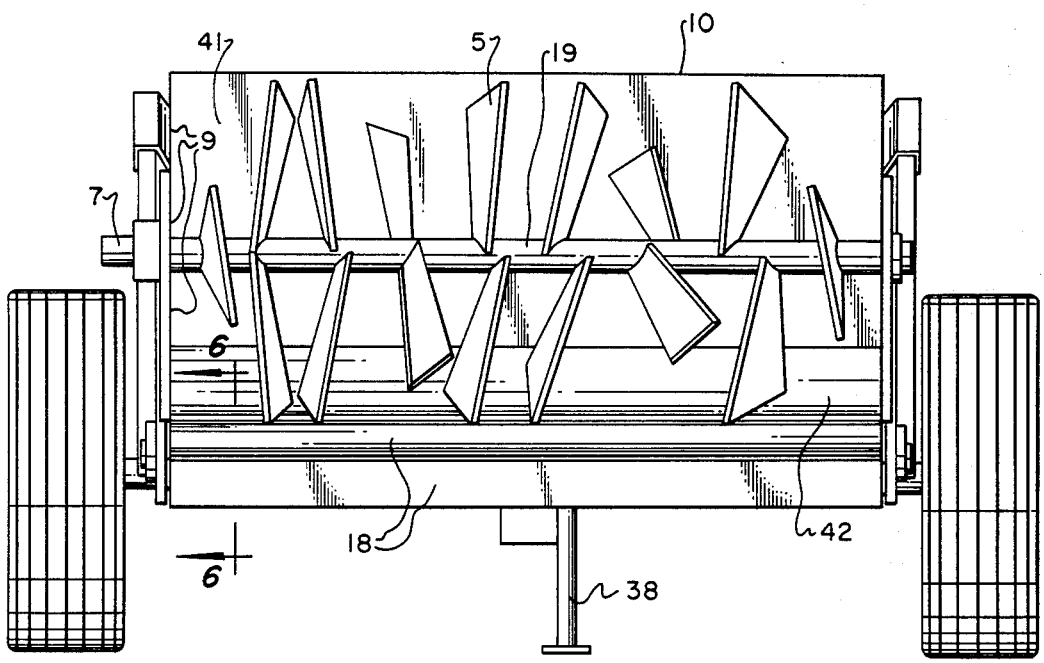
FIG. 4 is a view from the rear of the spreader showing the location of the distributor in relation to the movable floor.

FIG. 4 is a view from the rear of the spreader showing thrower blades 5 and the axially transverse rotary shaft 19 powered by the motor 7 and mounted in and between the oppositely disposed upright sides 9. The head wall 10 will be seen behind the thrower just mentioned with its front surface 41 and angulated surface 42 visible. Several of the slats 18 are seen turned around the idler rolls which are hidden behind them.

Figure 5:
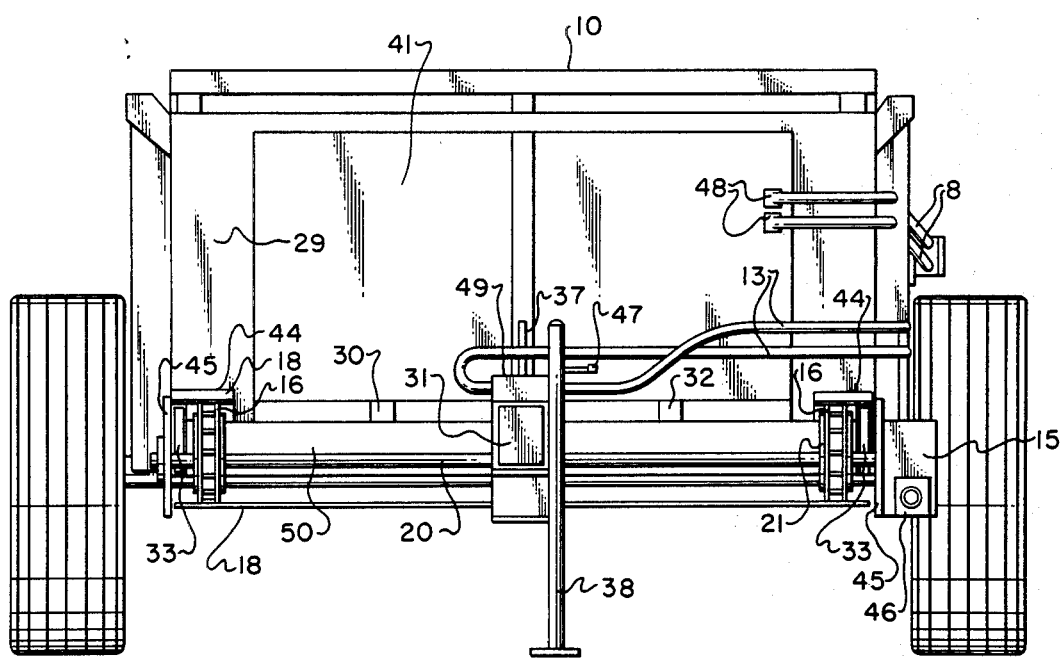
FIG. 5 is a view from the front of the spreader which shows how power is applied to move the floor.

FIG. 5 is a view looking from the front of the spreader. The front 29 is partially cut away to form openings for the chains 16. An extended portion 45 of the side walls 9 and front 29 forms supports for the bearings of the axially transverse rotary sprocket shaft 20. The end cross sections of the tubular longitudinal support members 30, 31, 32 and 33 are shown and the front surface 41 of the head wall 10 and a gusset 37 are visible through a cut away portion of the front wall 29.

The appearance of the transverse slats 18 in their lower most position is visible in this view. Along the right-hand side the reversible gear box 15 is visible with a worm gear bearing 46. The spreader is sitting on the stand 38 which is retractable by means of the jack pin 47. Hydraulic hoses 8 are shown terminating in the connectors 48. The hydraulic hoses 13 for the reversible hydraulic motor 14 are shown connected to a flow splitter block 49. This merely serves to reduce the total flow in the spreader floor's hydraulic system by returning a portion of the available flow back to the source.

A cross member 50 which forms the lower portion of the front 29 is shown extending transversely across the width of the spreader just behind the sprockets of the rotary shaft 20 and it is fastened to the longitudinal support members 33 and is also affixed to the other longitudinal support members 30, 31 and 32. In FIG. 4 a cross member similar to cross member 50 is fixed to the other ends of the longitudinal support members 30, 31, 32 and 33 but it is not visible through the slats 18.

Figure 7:
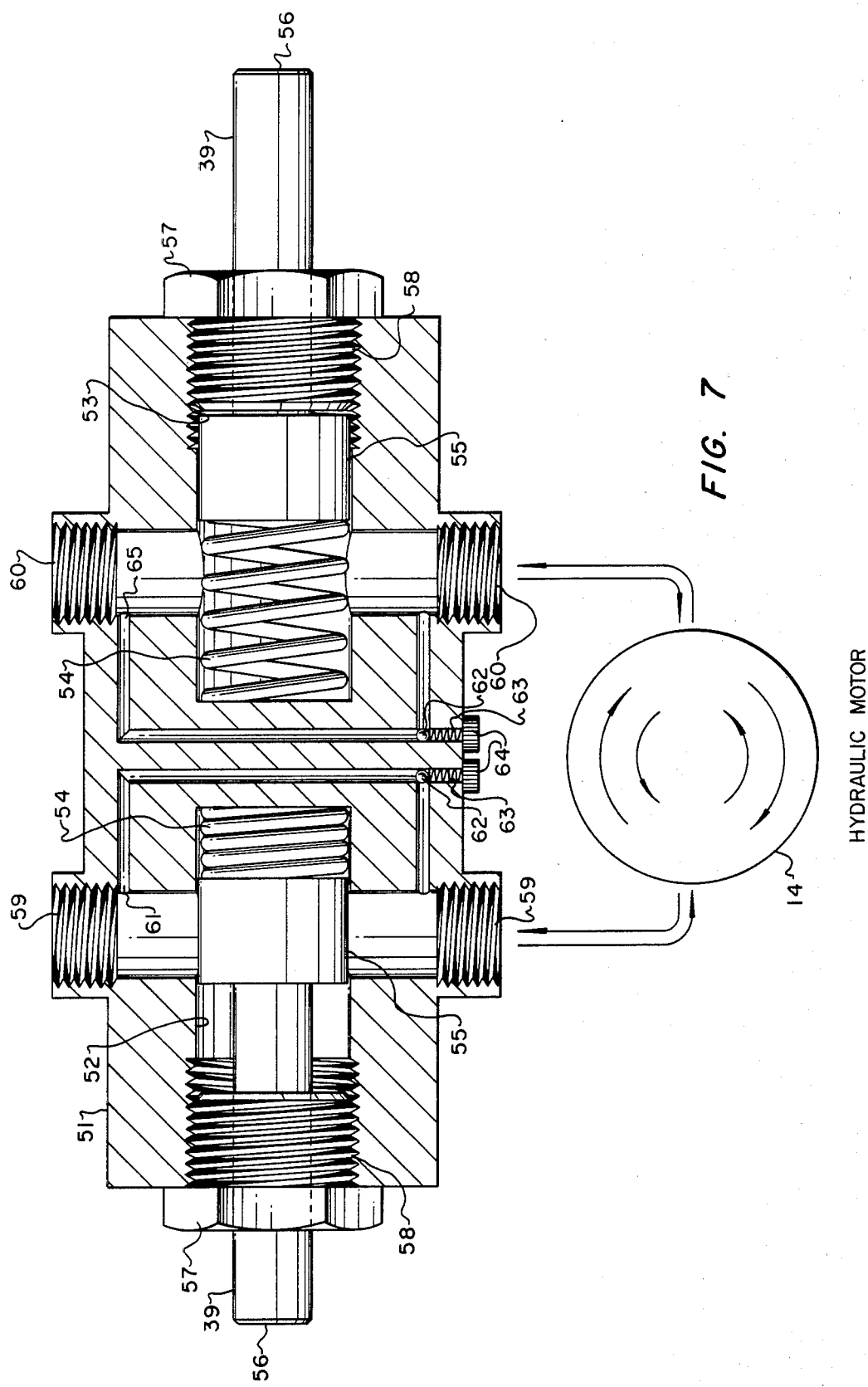
FIG. 7 is a cross section through the control valve to illustrate its details and represent how it is connected to the reversible hydraulic motor.

In FIG. 7 a cross section of a symmetrical half of the control valve 35 of FIG. 3 is shown. A body 51 forms the basic structure of the control valve 35. The body 51 is formed to define various ports and bores. A pair of oppositely disposed dead-ended bores 52 and 53 are formed by the walls of the body 51. The dead-ended portion of the oppositely disposed bores 52 and 53 have springs 54 which rest interiorly on the dead end of the bores. A pair of plungers 39 have a snug-fitting enlarged end 55 interiorly disposed in bores 52 and 53 and the plungers 39 have an extended portion exteriorly disposed from the body 51 and outside its confines so as to provide a contact surface 56 for an element whose motion is to be controlled. Snug-fitting closures 57 surround the extended portion of the plungers 39 and are removably fixed to the body 51 such as by threads 58. The plungers 39 are capable of slidable movement within the bores 52 and 53. The springs 54 normally urge the plungers outwardly from the dead end of the bores 53 and 54 by compression against the contact face of the enlarged portion 55. This is illustrated by the righthand plunger 39 of FIG. 7.

The body 51 is also formed to define ports 59 and 60 which extend therethrough having extended portions exteriorly of the body 51 which are suitably fitted to receive connections for hydraulic lines or hoses and large enough in size to permit a flow of hydraulic fluid. The ports 59 and 60 are transverse to the bores 52 and 53 and they pass transversely into said bores and out of the opposite side and may be said to cross said bores. The extended end of ports 59 and 60 is connected to a reversible source of pressurized hydraulic fluid whereas the opposite extended ends of ports 59 and 60 are hydraulically connected to a reversible hydraulic motor as shown in FIG. 7. Although the connections are not actually shown in FIG. 7 the position of the control valve 35 as shown in FIG. 7 is with pressure applied to the extended connection of port 60 where pressurized fluid can flow into the space created by the interaction of port 60 and bore 53 through the output end of port 60 and into the hydraulic motor 14.

Assume for the moment that both of the plungers 39 are in the open position as illustrated by the righthand side of FIG. 7. The hydraulic fluid then can flow through the motor and into the lower portion of port 59 in FIG. 7 on into the space created by the interaction of port 59 and the bore 52 and out the top portion of port 59 in FIG. 7. The top portion of port 59 is connected to the same source of hydraulic fluid as the input of port 60 but said output is on the low pressure or reservoir side. In this mode the hydraulic motor operates just as if it was connected directly to the source of hydraulic power and the control valve 35 would have no effect.

The hydraulic motor 14 drives the chains of the flexible movable floor as previously described. FIG. 7 is actually drawn to show the stop mode of the complete system with the gusset shown in FIG. 4 of the headwall 10 having moved sufficiently to contact the face 56 of the plunger 39 causing it to move inwardly of the valve 35 to where the enlarged portion has compressed the spring 54 and effectively blocked the port 59. This has stopped the flow of pressurized hydraulic fluid upon which the hydraulic motor depends, the hydraulic motor has stopped and consequently the headwall 10 must stop also. Under this state of conditions the pressure is equalized from the blockage caused by the plunger 39 and back to the hydraulic source.

Now imagine that the hydraulic source is reversed so that port 59 becomes the pressure side of the hydraulic fluid source and port 60 becomes the return side for the same hydraulic source such as by having a reversible hydraulic source. Since the extended portion of the plunger 39 is still located in the same position as before its enlarged portion continues to block port 59. The body 51 is formed to define a passageway 61 which is open between the upper and lower portions of the port 59 and which passes around the bore 52 without interconnecting to it. Part of the passageway 61 is chamfered to receive a ball 62 in a seat that will restrict the flow of pressurized fluid in one direction because the ball will be forced up against the seat. A spring holds the ball in place against the seat and an adjustable spring retaining nut can provide an adjustable spring pressure on the ball 62. Pressure can build in port 59 and passageway 61 until the force of the fluid overcomes the spring pressure on the ball so as to allow fluid to begin flowing through the passageway and into the lower portion of port 59 and on into the motor 14. This flow of oil reverses the hydraulic motor, passes back into the lower portion of port 60 and thence into the hydraulic fluid source. Since the passageway 61 is smaller than the port 59 the motor will move slowly at first until the headwall 10 begins to move away from the plunger 39 whereupon the spring 54 will begin to move the extended portion of the plunger 39 outwardly until the extended portion of the plunger 39 gradually opens up the main portion of the port 59 so that full flow of oil can begin at which time the hydraulic motor will speed up. At this point flow through the passageway 61 is no longer needed.

It will be seen that the port 60 is equipped with the same passageway 65 as the port 59 and has the same ball and spring mechanism for providing one-way flow. Thus when flow from the hydraulic motor is passing into the lower portion of port 60 it cannot pass through the lower portion of passageway 65 since the spring is urging the ball against the seat thus blocking passageway 65 from the flow of fluid. It is evident from FIG. 3 that in this mode the motor will continue running, driving the flexible floor in the unloading mode until such time as the stop 36 of FIG. 3 moves along sufficiently to come in contact with the contact face 56 of the plunger 39 of the bore 53 in which case the plunger 39 will be gradually moved inward to eventually cover the opening 60 and once the fluid is blocked in port 60 the mechanical motion will cease just as before.

The control valve 35 is thus responsive to the extreme positions of the headwall 10 and by interaction with a portion of it or the stop 36 at either extreme position it provides an automatic means of stopping the mechanical motion of the spreader, and more particularly the flexible movable floor, at either of the extreme positions. The control valve 35 is suitably located near the front of the spreader so as to contact a gusset of the headwall 10 and the stop 36 is adjusted so as to permit the headwall to move as close to the thrower blades as desired without actually contacting them. Once the mechanism is automatically stopped by contact through control valve 35 it will remain in that position without any action by the operator but can be reversed by reversing the hydraulic system to which it is attached.

In the best mode I have found it desirable to use $6\frac{1}{2}''$ diameter idler rolls 17 which allows the use of a 6" link 25 in order to keep the space requirements at the rear of the spreader to a minimum so as to reduce the cost of construction while still providing smooth operation. It is important that the links 25 have a smooth radius like the radius of the idler 17 in order to prevent the chain loop from alternately pulling tight and loose, which otherwise would require a large diameter idler or sprocket as with a conventional type chain. The radius on the underside of the chain must meet the centerline of the connecting pins of the chain. The rear idler is made of steel with hubs welded onto a shaft. The shaft is supported by flanged bearings.

The slats 18 are 6"×3/16" steel plates with edges centered over the pivot points of the links 25 and welded thereto. Since there is no opening in the middle of the links as in a conventional chain because the slats occupy that space, conventional sprockets are not desirable beneath the flexible floor portion of the chain loop. The idlers themselves are simply smooth cylinders about 6" wide over which the links 25 ride. Because there are no sprockets at the rear of the spreader, side to side movement of the floor formed by the slats is restricted by having the slats extend almost the full width of the upright sides 9. 1½" angle irons 34 are fixed to the sides 9 just above the level of the movable floor as edges which extend over the ends of the slats 18 and prevent them from riding up. Even so the slats are flexible enough that if material is caught between the edges they can accommodate a certain amount of distortion without jamming.

The flexible movable floor has the advantage over other devices that it does not drag the material towards the thrower blades of the distributor but rather it carries the material off in a gradual manner. A more complete and positive unloading is obtained. The angled portion 42 of the headwall 10 further serves this purpose by preventing a dead space near the base of the headwall 10 where the rotating thrower blades cannot reach. The positive automatic control valve 35 furthers this goal by permitting an ending position for unloading whereby the headwall 10 is very close to the rotating blades without the danger of damaging them.

The rotating distributor mechanism or thrower at the rear of the spreader can be entirely removed. The hydraulic motor 7 is connected to its hydraulic lines by quick disconnect couplers and the removable sides 6 are bolted to the sides 9 of the removable frame. This permits the use of the spreader as an unloader. An openable endgate could be mounted. There is no need for the thrower mechanism hydraulic system to be any part of the hydraulic system for the movable floor of this invention. In fact, the thrower could be operated mechanically by means of the power take-off unit on the tractor or by means of an additional hydraulic pump located either on the tractor or on the spreader driven by the power take-off unit and generally there is no need for variable speed. Modern tractors have more than one hydraulic system which can be connected by quick connect couplers and hoses to operate the thrower mechanism which should have an off-on control.

I have found that attempts to use mechanical stops to stop the movement of the movable floor at the extreme positions to be unsatisfactory without the control system. A hydraulic pressure of 1,200 PSI is commonly found on tractors and some tractors have hydraulic systems that operate at 2,600 PSI. Such pressures applied to the system can result in damage to the gears, chains and other parts. Use of a pressure relief valve in the moving floor system can reduce this problem but a temporary resistance such as from a frozen or partly frozen load causes the system to relieve without movement because of insufficient torque. The beauty of my control valve system is that full hydraulic pressure is available to overcome temporary resistances but yet when the extreme positions are reached the entire hydraulic forces are contained within the motor, valve lines, and valves which are parts that are all fully intended to handle such pressure on a continuous basis.

The reversal of the hydraulic system at the extreme position causes a desirable slow movement of about 1" per minute until the main ports open up whereupon a speed of approximately 1' per minute is achieved. This gives the operator a little time and avoids jerky starts. The system will actually operate with hydraulic pressures as low as 500 PSI. A variable speed hydraulic flow control valve on the tractor permits the operator to adjust the unloading speed.

A very desirable effect that is obtained with the moving floor aside from improved and more complete unloading is the protection offered to the chains and sprockets from contact with the load. Although there are abutting edges which form the floor nevertheless direct contact with the load is prevented and this tends to reduce corrosion and jamming caused by freezing. A frozen load can be carried off by the floor even though it could not be pushed or dragged off.

I claim:

1. A manure spreading apparatus of the type having a mobile frame which can be moved over the ground, a load containing load box on the frame having upright sides wherein a rear side is modified by having a rotatable thrower which can spread a load during movement and a powered unloading mechanism for moving a load of manure toward the thrower wherein in operable combination the improvement comprises:

a reversibly moveable flexible floor at the bottom of the loadbox on the mobile frame on which a load can be supported and unloaded without relative movement between the load and the moveable floor, the reversibly moveable flexible floor further comprising:

a plurality of abutting slats transverse to the spreader's longitudinal axis, lying in a horizontal plane at the load box bottom slideably supported by the mobile frame; the length of the slats extending betwen and next to the upright sides of the load box to form a floor in the load box;

chain loops running along each side of the load box front to rear under the slats, part of which has a plurality of slat supporting links with an upper portion of each link fixed to a slat and a lower portion of each link having an idler roll engaging radius which meets the centerline of connecting pins at the ends of each link joining the links flexibly under and in line with the abutting edges of the slats which form the flexible floor so that the chain loops will not tighten and loosen as they pass over and around idler rolls;

a rear axially transverse rotary shaft having axially mounted idler rolls with a radius like that of each slat supporting link disposed to receive them and to fix the rear location of each chain loop while permitting the slat supporting links to pass around them when movement of the chain loops is initiated;

a front axially transverse rotary shaft having axially mounted sprockets disposed to drivingly receive a portion of each chain loop forward of the headwall and flexible moveable floor through its full range of movement, longitudinally lined up with the rear idler roll, which fixes the front location of the chain loop while permitting the chain to pass around the sprockets when movement of the chain loops is initiated;

a load retaining headwall which forms an upright forward part of the flexible moveable floor and which moves with it;

means for reversibly driving the flexible moveable floor and headwall between a front extreme position where the headwall is located away from the thrower and a rear extreme position where the headwall is located near the thrower;

control means responsive to the extreme positions of the headwall portion of the moveable floor which automatically stops the moveable floor at either extreme position of the headwall.

2. A manure spreading apparatus of the type having a mobile frame which can be moved over the ground, a load containing loadbox on the frame having upright sides wherein a rear side is modified by having a rotatable thrower which can spread a load during movement and a powered unloading mechanism for moving a load of manure toward the thrower wherein an operable combination the improvement comprises:

a reversibly moveable flexible floor at the bottom of the loadbox on the mobile frame on which a load can be supported and unloaded without relative movement between the load and the moveable floor;

a load retaining headwall which forms an upright forward part of the flexible moveable floor and which moves with it;

a reversible hydraulic motor mounted on the spreader and adapted for connection to a reversible source of pressurized hydraulic fluid as from a tractor hydraulic system;

a reversible gear train mounted on the spreader and driven by the motor which is drivingly connected to a front axially transverse rotary shaft with sprocket means capable of causing movement of the flexible moveable floor by movement of the sprocket and chain loops to which the moveable floor is connected;

a control valve on the spreader having a body formed to define a pair of oppositely disposed dead ended bores and a port crossing each bore and extending through the body, the ports adapted to one side of the body to be connected to a pressurized source of hydraulic fluid as from a tractor hydraulic system, the ports on the other side of the body connected to the reversible hydraulic motor that can driveably move the flexible moveable floor in one direction by flow through one port and in the opposite direction by flow through the other port;

a pair of oppositely disposed independent plungers each slideably disposed in a bore and having an extended portion external of the body with a means for urging the plungers outwardly in a normally open position a sufficient distance to uncover the openings where the ports cross the bores, the plungers having means for containing hydraulic fluid under pressure in the normally open position and means for blocking a port when force applied to the extended portion of either of the plungers moves the plungers inwardly in the bores so that flow through a port is unrestrained or blocked depending on the plunger position;

a by-pass means for hydraulic fluid from the source to the motor with a means for permitting one way flow of hydraulic fluid in the by-pass around a port that is blocked by a plunger so that reversal of hydraulic pressure in the system to which the control valve is adapted to be attached will cause enough flow in the by-pass means to operate the motor;

extreme position stop means on the chain loop which interact mechanically with the plungers of the control valve to cut off flow of hydraulic fluid to the reversible motor when the headwall of the flexible moveable floor is in its front most position for loading or its rear most position for unloading.

3. A manure spreading apparatus of the type having a mobile frame which can be moved over the ground, a load containing load box on the frame having upright sides wherein a rear side is modified by having a rotatable thrower which can spread a load during movement and a powered unloading mechanism for moving a load of manure toward the thrower wherein in operable combination the improvement comprises:

a plurality of abutting slats transverse to the spreader's longitudinal axis, lying in a horizontal plane at the load box bottom slideably supported by the mobile frame; the length of the slats extending between and next to the upright sides of the load box to form a floor in the load box;

chain loops running along each side of the loadbox front to rear under the slats part of which has a plurality of slat supporting links with an upper portion of each link fixed to a slat and a lower portion of each link having an idler roll engaging radius which meets the centerline of connecting pins at the ends of each link joining the links flexibly under and in line with the abutting edges of the slats which form the flexible floor so that the chain loops will not tighten and loosen as they pass over and around idler rolls;

a rear axially transverse rotary shaft having axially mounted idler rolls with a radius like that of each slat supporting link disposed to receive them and to fix the rear location of each chain loop while permitting the slat supporting links to pass around them when movement of the chain loops is initiated;

a front axially transverse rotary shaft having axially mounted sprockets disposed to drivingly receive a portion of each chain loop forward of the headwall and flexible moveable floor through its full range of movement, longitudinally lined up with the rear idler roll, which fixes the front location of the chain loop while permitting the chain to pass around the sprockets when movement of the chain loops is initiated;

a load retaining headwall which forms an upright forward part of the flexible moveable floor and which moves with it;

a reversible hydraulic motor mounted on the spreader and adapted for connection to a reversible source of pressurized hydraulic fluid as from a tractor hydraulic system;

a reversible gear train mounted on the spreader and driven by the motor, which is drivingly connected to a front axially transverse rotary shaft with sprocket means capable of causing movement of the flexible moveable floor by movement of the sprockets and chain loops to which the flexible moveable floor is connected;

a control valve on the spreader having a body formed to define a pair of oppositely disposed dead ended bores and a port crossing each bore and extending through the body, the ports adapted on one side of the body to be connected to a pressurized source of hydraulic fluid as from a tractor hydraulic system, the ports on the other side of the body connected to the reversible hydraulic motor that can driveably move the flexible moveable floor in one direction by flow through one port and in the opposite direction by flow through the other port;

a pair of oppositely disposed independent plungers each slideably disposed in a bore and having an extended portion external of the body with a means for urging the plungers outwardly in a normally open position a sufficient distance to uncover the openings where the ports cross the bores, the plungers having means for containing hydraulic fluid under pressure in the normally open position and means for blocking a port when force applied to the extended portion of either of the plungers moves the plunger inwardly in the bores so that flow through a port is unrestrained or blocked depending on the plunger position;

a bypass means for hydraulic fluid from the source to the motor with a means for permitting one way flow of hydraulic fluid in the bypass around a port that is blocked by a plunger so that reversal of hydraulic pressure in the system which the control valve is adapted to be attached to will cause enough flow in the bypass means to operate the motor;

extreme position stop means on the chain loop which interact mechanically with the plungers of the control valve to cut off flow of hydraulic fluid to the reversible motor when the headwall of the flexible moveable floor is in its front most position for loading or its rear most position for unloading.

4. In a manure spreader in operable combination, an improved unloader comprising:

a reversibly moveable flexible floor at the bottom of the loadbox on the mobile frame on which a load can be supported and unloaded without relative movement between the load and the moveable floor;

a load retaining headwall which forms an upright forward part of the flexible moveable floor and which moves with it;

means for reversibly driving the flexible moveable floor and headwall between a front extreme position where the headwall is locatd away from the thrower and a rear extreme position where the headwall is located near the thrower, wherein the reversible drive means further comprises, a reversible hydraulic motor mounted on the spreader and adapted for connection to a reversible source of pressurized hydraulic fluid as from a tractor hydralic system;

a reversible gear train mounted on the spreader and driven by the motor, which is drivingly connected to a front axially transverse rotary shaft with sprocket means capable of causing movement of the flexible moveable floor by movement of the sprockets and chain loops to which the flexible moveable floor is connected;

control means responsive to the extreme positons of the headwall portion of the moveable floor which automatically stops the moveable floor at either extreme position of the headwall, said control means further comprising, a control valve on the spreader having a body formed to define a pair of oppositely disposed dead ended bores and a port crossing each bore and extending through the body, the ports adapted on one side of the body to be connected to a pressurized source of hydraulic fluid as from a tractor hydraulic system, the ports on the other side of the body connected to the reversible hydraulic motor that can driveably move the flexible moveable floor in one direction by flow through one port and in the opposite direction by flow through the other port;

a pair of oppositely disposed independent plungers each slideably disposed in a bore and having an extended portion external of the body with a means for urging theplungers outwardly in a normally open position a sufficient distance to uncover the openings where the ports cross the bores, the plungers having means for containing hydraulic fluid under pressure in the normally open position and means for blocking a port when force applied to the extended portion of either of the plungers moves the plunger inwardly in the bores so that flow through a port is unrestrained or blocked depending on the plunger position;

a bypass means for hydraulic fluid from the souree to the motor with a means forpermitting one way flow of hydraulic fluid in the bypass around a port that is blocked by a plunger so that reversal of hydraulic pressure in the system to which the control valve is adapted to be attached will cause enough flow in the bypass means to operate the motor;

extreme position stop means on the chain loop which interact mechanically with the plungers of the control valve to cut off flow of hydraulic fluid to the reversible motor when the head wall of the flexible moveable floor is in its front most position for loading or its rear most position for unloading.

5. The improved unloader for a manure spreader as recited in claim 4 the reversibly moveable flexible floor further comprising:

a plurality of abutting slats transverse to the spreader's longitudinal axis, lying in a horizontal plane at the load box bottom slideably supported by the mobile frame; the length of the slats extending between and next to the upright sides of the load box to form a floor in the load box;

chain loops running along each side of the loadbox front to rear under the slats part of which has a plurality of slat supporting links with an upper portion of each link fixed to a slat and a lower portion of each link having an idler roll engaging radius which meets the centerline of connecting pins at the ends of each link joining the links flexibly under and in line with the abutting edges of the slats which form the flexible floor so that the chain loops will not tighten and loosen as they pass over and around idler rolls;

a rear axially transverse rotary shaft having axially mounted idler rolls with a radius like that of each slat supporting link disposed to receive them and to fix the rear location of each chain loop while permitting the slat supporting links to pass around them when movement of the chain loops is initiated;

a front axially transverse rotary shaft having axially mounted sprockets disposed to drivingly receive a portion of each chain loop forward of the headwall and flexible moveable floor through its full range of movement, longitudinally lined up with the rear idler roll, which fixes the front location of the chain loop while permitting the chain to pass around the sprockets when movement of the chain loops is initiated.

6. In a manure spreader, an improved unloader comprising:

- a plurality of abutting slats transverse to the spreader's longitudinal axis, lying in a horizontal plane at the load box bottom slideably supported by the mobile frame; the length of the slats extending between and next to the upright sides of the load box to form a floor in the load box;
- chain loops running along each side of the loadbox front to rear under the slats part of which has a plurality of slat supporting links with an upper portion of each link fixed to a slat and a lower portion of each link having an idler roll engaging radius which meets the centerline of connecting pins at the ends of each link joining the links flexibly under and in line with the abutting edges of the slats which form the flexible floor so that the chain loops will not tighten and loosen as they pass over and around idler rolls;
- a rear axially transverse rotary shaft having axially mounted idler rolls with a radius like that of each slat supporting link disposed to receive them and to fix the rear location of each chain loop while permitting the slat supporting links to pass around them when movement of the chain loops is initiated;
- a front axially transverse rotary shaft having axially mounted sprockets disposed to drivingly receive a portion of each chain loop forward of the headwall and flexible moveable floor through its full range of movement, longitudinally lined up with the rear idler roll, which fixes the front location of the chain loop while permitting the chain to pass around the sprockets when movement of the chain loops is initiated.
- a load retaining headwall which forms an upright forward part of the flexible moveable floor and which moves with it;
- a reversible hydraulic motor mounted on the spreader and adapted for connection to a reversible source of pressurized hydraulic fluid as from a tractor hydraulic system;
- a reversible gear train mounted on the spreader and driven by the motor, which is drivingly connected to a front axially transverse rotary shaft with sprocket means capable of causing movement of the flexible moveable floor by movement of the sprockets and chain loops to which the flexible moveable floor is connected;
- a control valve on the spreader having a body formed to define a pair of oppositely disposed dead ended bores and a port crossing each bore and extending through the body, the ports adapted on one side of the body to be connected to a pressurized source of hydraulic fluid as from a tractor hydraulic system, the ports on the other side of the body connected to the reversible hydraulic motor that can driveably move the flexible moveable floor in one direction by flow through one port and in the opposite direction by flow through the other port;
- a pair of oppositely disposed independent plungers each slideably disposed in a bore and having an extended portion external of the body with a means for urging the plungers outwardly in a normally open position a sufficient distance to uncover the openings where the ports cross the bores, the plungers having means for containing hydraulic fluid under pressure in the normally open position and means for blocking a port when force applied to the extended portion of either of the plungers moves the plunger inwardly in the bores so that flow through a port is unrestrained or blocked depending on the plunger position;
- a bypass means for hydraulic fluid from the source to the motor with a means for permitting one way flow of hydraulic fluid in the bypass around a port that is blocked by a plunger so that reversal of hydraulic pressure in the system to which the control valve is adapted to be attached will cause enough flow in the bypass means to operate the motor;
- extreme position stop means on the chain loop which interact mechanically with the plungers of the control valve to cut off flow of hydraulic fluid to the reversible motor when the headwall of the flexible moveable floor is in its front most position for loading or its rear most position for unloading.

* * * * *